US012761642B2

(12) United States Patent
Deligio

(10) Patent No.: US 12,761,642 B2
(45) Date of Patent: Oct. 13, 2026

(54) SYSTEMS AND METHODS FOR REPRESENTATION OF EVENT DATA

(71) Applicant: Tyco Fire & Security GmbH, Neuhasen am Rheinfall (CH)

(72) Inventor: Dominick M. Deligio, Lake Villa, IL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 303 days.

(21) Appl. No.: 17/955,150

(22) Filed: Sep. 28, 2022

(65) Prior Publication Data

US 2023/0097096 A1 Mar. 30, 2023

Related U.S. Application Data

(60) Provisional application No. 63/249,958, filed on Sep. 29, 2021.

(51) Int. Cl.
*G05B 23/02* (2006.01)

(52) U.S. Cl.
CPC ................................ *G05B 23/0227* (2013.01)

(58) Field of Classification Search
None
See application file for complete search history.

(56) References Cited

U.S. PATENT DOCUMENTS

| | | | | |
|---|---|---|---|---|
| 6,487,457 | B1 * | 11/2002 | Hull | G05B 19/042 700/86 |
| 8,099,178 | B2 * | 1/2012 | Mairs | H04L 67/75 709/219 |
| 8,655,830 | B2 | 2/2014 | Mackay | |
| 9,189,527 | B2 * | 11/2015 | Park | G06F 9/541 |
| 9,753,455 | B2 | 9/2017 | Drees | |
| 10,139,792 | B2 | 11/2018 | Schmitt et al. | |
| 10,402,767 | B2 | 9/2019 | Noboa et al. | |
| 11,182,047 | B2 | 11/2021 | Nayak et al. | |
| 2010/0324962 | A1 | 12/2010 | Nesler et al. | |
| 2011/0047418 | A1 | 2/2011 | Drees et al. | |
| 2011/0071685 | A1 | 3/2011 | Huneycutt et al. | |
| 2011/0257911 | A1 | 10/2011 | Drees et al. | |
| 2012/0022700 | A1 | 1/2012 | Drees et al. | |
| 2012/0259583 | A1 | 10/2012 | Noboa et al. | |

(Continued)

OTHER PUBLICATIONS

PersonalSCADA Version 2.0, User's Guide, EUTECH Cybernetics Pte Ltd., Singapore, Nov. 2002 (Year: 2002).*

(Continued)

*Primary Examiner* — Carlos R Ortiz Rodriguez
(74) *Attorney, Agent, or Firm* — Foley & Lardner LLP

(57) ABSTRACT

A method for facilitating analysis of a fault in a building system. The method may include determining, by a processing circuit, occurrence of a fault, and capturing, by the processing circuit at a time of occurrence of the fault, a snapshot of conditions at the time by selecting a set of data points relating to the building equipment experiencing the fault and storing, by the processing circuit, event data comprising values of the set of data points at the time of occurrence of the fault. The method may also include facilitating analysis of the fault by providing, at a later time after the time of occurrence of the fault, the snapshot via a graphical user interface. The snapshot includes the event data.

20 Claims, 9 Drawing Sheets

(56) References Cited

U.S. PATENT DOCUMENTS

| | | | |
|---|---|---|---|
| 2013/0325377 | A1 | 12/2013 | Drees et al. |
| 2017/0011318 | A1 | 1/2017 | Vigano et al. |
| 2017/0213303 | A1 | 7/2017 | Papadopoulos et al. |
| 2020/0379423 | A1 | 12/2020 | Wenzel et al. |
| 2022/0058556 | A1 | 2/2022 | Warake et al. |

OTHER PUBLICATIONS

Part 1, personalSCADA Version 2.0, User's Guide, EJTECH Cybernetics Pte Ltd., Singapore, Nov. 2002 (Year: 2002).*

Part 2, personalSCADA Version 2.0, User's Guide, EJTECH Cybernetics Pte Ltd., Singapore, Nov. 2002 (Year: 2002).*

Hu, Wenkai, et al. "Design of visualization plots of industrial alarm and event data for enhanced alarm management." Control Engineering Practice 79 (2018): 50-64. (Year: 2018).*

* cited by examiner 700 702 704 706 708 710 712 714 716

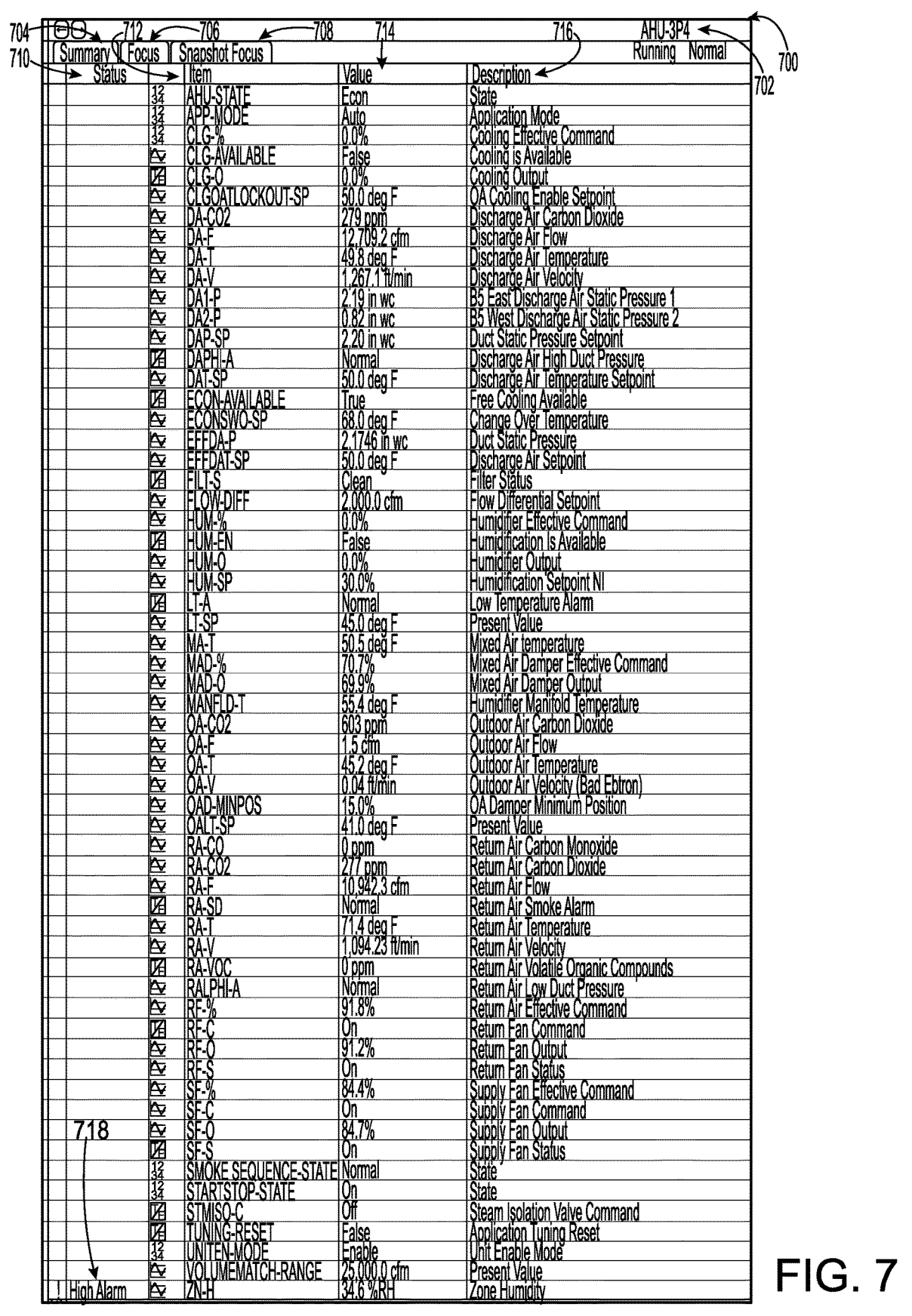

AHU-3P4

Summary | Focus | Snapshot Focus — Running Normal

| Status | Item | Value | Description |
|---|---|---|---|
| | AHU-STATE | Econ | State |
| | APP-MODE | Auto | Application Mode |
| | CLG-% | 0.0% | Cooling Effective Command |
| | CLG-AVAILABLE | False | Cooling is Available |
| | CLG-O | 0.0% | Cooling Output |
| | CLGOATLOCKOUT-SP | 50.0 deg F | OA Cooling Enable Setpoint |
| | DA-CO2 | 279 ppm | Discharge Air Carbon Dioxide |
| | DA-F | 12,709.2 cfm | Discharge Air Flow |
| | DA-T | 49.8 deg F | Discharge Air Temperature |
| | DA-V | 1,267.1 ft/min | Discharge Air Velocity |
| | DA1-P | 2.19 in wc | B5 East Discharge Air Static Pressure 1 |
| | DA2-P | 0.82 in wc | B5 West Discharge Air Static Pressure 2 |
| | DAP-SP | 2.20 in wc | Duct Static Pressure Setpoint |
| | DAPHI-A | Normal | Discharge Air High Duct Pressure |
| | DAT-SP | 50.0 deg F | Discharge Air Temperature Setpoint |
| | ECON-AVAILABLE | True | Free Cooling Available |
| | ECONSWO-SP | 68.0 deg F | Change Over Temperature |
| | EFFDA-P | 2.1746 in wc | Duct Static Pressure |
| | EFFDAT-SP | 50.0 deg F | Discharge Air Setpoint |
| | FILT-S | Clean | Filter Status |
| | FLOW-DIFF | 2,000.0 cfm | Flow Differential Setpoint |
| | HUM-% | 0.0% | Humidifier Effective Command |
| | HUM-EN | False | Humidification Is Available |
| | HUM-O | 0.0% | Humidifier Output |
| | HUM-SP | 30.0% | Humidification Setpoint NI |
| | LT-A | Normal | Low Temperature Alarm |
| | LT-SP | 45.0 deg F | Present Value |
| | MA-T | 50.5 deg F | Mixed Air temperature |
| | MAD-% | 70.7% | Mixed Air Damper Effective Command |
| | MAD-O | 69.9% | Mixed Air Damper Output |
| | MANFLD-T | 55.4 deg F | Humidifier Manifold Temperature |
| | OA-CO2 | 603 ppm | Outdoor Air Carbon Dioxide |
| | OA-F | 1.5 cfm | Outdoor Air Flow |
| | OA-T | 45.2 deg F | Outdoor Air Temperature |
| | OA-V | 0.04 ft/min | Outdoor Air Velocity (Bad Ebtron) |
| | OAD-MINPOS | 15.0% | OA Damper Minimum Position |
| | OALT-SP | 41.0 deg F | Present Value |
| | RA-CO | 0 ppm | Return Air Carbon Monoxide |
| | RA-CO2 | 277 ppm | Return Air Carbon Dioxide |
| | RA-F | 10,942.3 cfm | Return Air Flow |
| | RA-SD | Normal | Return Air Smoke Alarm |
| | RA-T | 71.4 deg F | Return Air Temperature |
| | RA-V | 1,094.23 ft/min | Return Air Velocity |
| | RA-VOC | 0 ppm | Return Air Volatile Organic Compounds |
| | RALPHI-A | Normal | Return Air Low Duct Pressure |
| | RF-% | 91.8% | Return Air Effective Command |
| | RF-C | On | Return Fan Command |
| | RF-O | 91.2% | Return Fan Output |
| | RF-S | On | Return Fan Status |
| | SF-% | 84.4% | Supply Fan Effective Command |
| | SF-C | On | Supply Fan Command |
| 718 | SF-O | 84.7% | Supply Fan Output |
| | SF-S | On | Supply Fan Status |
| | SMOKE SEQUENCE-STATE | Normal | State |
| | STARTSTOP-STATE | On | State |
| | STMISO-C | Off | Steam Isolation Valve Command |
| | TUNING-RESET | False | Application Tuning Reset |
| | UNITEN-MODE | Enable | Unit Enable Mode |
| | VOLUMEMATCH-RANGE | 25,000.0 cfm | Present Value |
| ! High Alarm | ZN-H | 34.6 %RH | Zone Humidity |

FIG. 7

SYSTEMS AND METHODS FOR REPRESENTATION OF EVENT DATA

CROSS-REFERENCE TO RELATED APPLICATIONS

This application claims the benefit of and priority to U.S. Provisional Application No. 63/249,958, filed Sep. 29, 2021, the entire disclosure of which is incorporated by reference herein in its entirety.

BACKGROUND

The present disclosure relates generally to building management systems. The present disclosure relates more particularly to system and method for representation of event data in building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS can collect data from building equipment. In some cases, the collected data may fall beyond a valid range, i.e., outliers which may cause triggering of alarm. To ascertain the cause of alarm, it is important to identify and investigate the outliers and status of affiliated data points that caused triggering of alarm.

SUMMARY

One implementation of the present disclosure is a method for facilitating analysis of a fault in a building system. The method includes determining, by a processing circuit, occurrence of a fault and capturing, by the processing circuit at a time of occurrence of the fault, a snapshot of conditions at the time by selecting a set of data points relating to the building equipment experiencing the fault and storing, by the processing circuit, event data includes values of the set of data points at the time of occurrence of the fault. The method may also include facilitating analysis of the fault by providing, at a later time after the time of occurrence of the fault, the snapshot via a graphical user interface. The snapshot includes the event data.

In some embodiments, the snapshot includes a list of the set of data points and the values for the set of data points at the time of occurrence of the fault. In some embodiments, the method includes abstaining from storing other values of the set of data points corresponding to times other than the time of occurrence of the fault.

In some embodiments, selecting the set of data points relating to the building equipment experiencing the fault is performed based on a flag signal associated with the fault. The set of data points may be a subset of a plurality of available data points for the building system. In some embodiments, storing the event data includes abstaining from storing values of other data points of the plurality of available data points, the other data points not included in the set of data points.

In some embodiments, the method includes receiving, at the later time, a user request to view information corresponding to the fault, and providing the snapshot via the graphical user interface in response to the user request. In some embodiments, the method includes abstaining from storing values of the set of data points for times other than the time of occurrence of the fault such that the values of the set of data points for times other than the time of occurrence of the fault are unavailable at the later time. The method may include altering an operation of the building equipment based on the snapshot.

Another implementation of the present disclosure is building management system (BMS). The BMS includes building equipment operable to affect one or more variable states or conditions of a building and circuitry. The circuitry is programmed to capture, by the processing circuit at a time of occurrence of the fault, a snapshot of conditions at the time by selecting a set of data points relating to a portion of the building equipment experiencing the fault and storing event data includes values of the set of data points at the time of occurrence of the fault. The circuitry is also programed to facilitate analysis of the fault by providing, at a later time after the time of occurrence of the fault, the snapshot via a graphical user interface with the snapshot showing the event data.

In some embodiments, the snapshot includes a list of the set of data points and the values for the set of data points at the time of occurrence of the fault. In some embodiments, the circuitry is programmed to abstain from storing other values of the set of data points corresponding to times other than the time of occurrence of the fault. In some embodiments, the set of data points relating to the portion of the building equipment experiencing the fault is a subset of a plurality of available data points available in the BMS.

In some embodiments, storing the event data includes storing values for the set of data points without storing values for other data points of the plurality of available data points. In some embodiments, the circuitry is programed to abstain from storing values of the set of data points for times other than the time of occurrence of the fault such that the values of the set of data points for times other than the time of occurrence of the fault are unavailable to the circuitry at the later time.

In some embodiments, the circuitry is further programmed to alter an operation of the building equipment based on the snapshot.

Another implementation of the present disclosure is one or more non-transitory computer-readable media storing program instructions that, when executed by one or more processors, cause the one or more processors to perform operations. The operations include capturing, concurrently with a building equipment fault, a snapshot by selecting a set of data points relating to a unit of building equipment experiencing the building equipment fault and storing, by the processing circuit, values of the set of data points at the time of occurrence of the building equipment fault. The operations also include facilitating analysis of the fault by providing, at a later time after the time of occurrence of the building equipment fault, the snapshot via a graphical user interface. The snapshot includes the values of the set of data points at the time of occurrence of the building equipment fault.

In some embodiments, the snapshot includes a list of the set of data points and the values for the set of data points at the time of occurrence of the building equipment fault. In some embodiments, the operations include abstaining from storing other values of the set of data points corresponding to times other than the time of occurrence of the building equipment fault. In some embodiments, the operations include abstaining from storing values of other available data points not included in the set of data points.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a snapshot of an example interface depicting representation of event data, according to some embodiments.

DETAILED DESCRIPTION

Before turning to the Figures, it should be understood that the disclosure is not limited to the details or methodology set forth in the description or illustrated in the figures. It should also be understood that the terminology is for the purpose of description only and should not be regarded as limiting.

Referring generally to the Figures, a computing system for representing event data in a building management system (BMS) is shown and described. The computing system may be utilized in conjunction with a plurality of building automation or management systems, subsystems, or as a part high level building automation system. For example, the computing system may be a part of a Johnson Controls Facility Explorer system.

The present disclosure describes systems and methods that address the shortcomings of conventional systems. For example, embodiments of the computing system disclosed herein can be configured to capture a snapshot of event data associated with a building equipment at fault, when an alarm event occurs. The snapshot of event data is stored in the system that can be viewed or presented later in time. Accordingly, embodiments of the present disclosure describe techniques for facilitating representation of event data for enabling users to ascertain the cause of occurrence of the alarm. In some embodiments, a system and a method advantageously represents event data in building management systems.

Building and Building Management System

Figure 1:
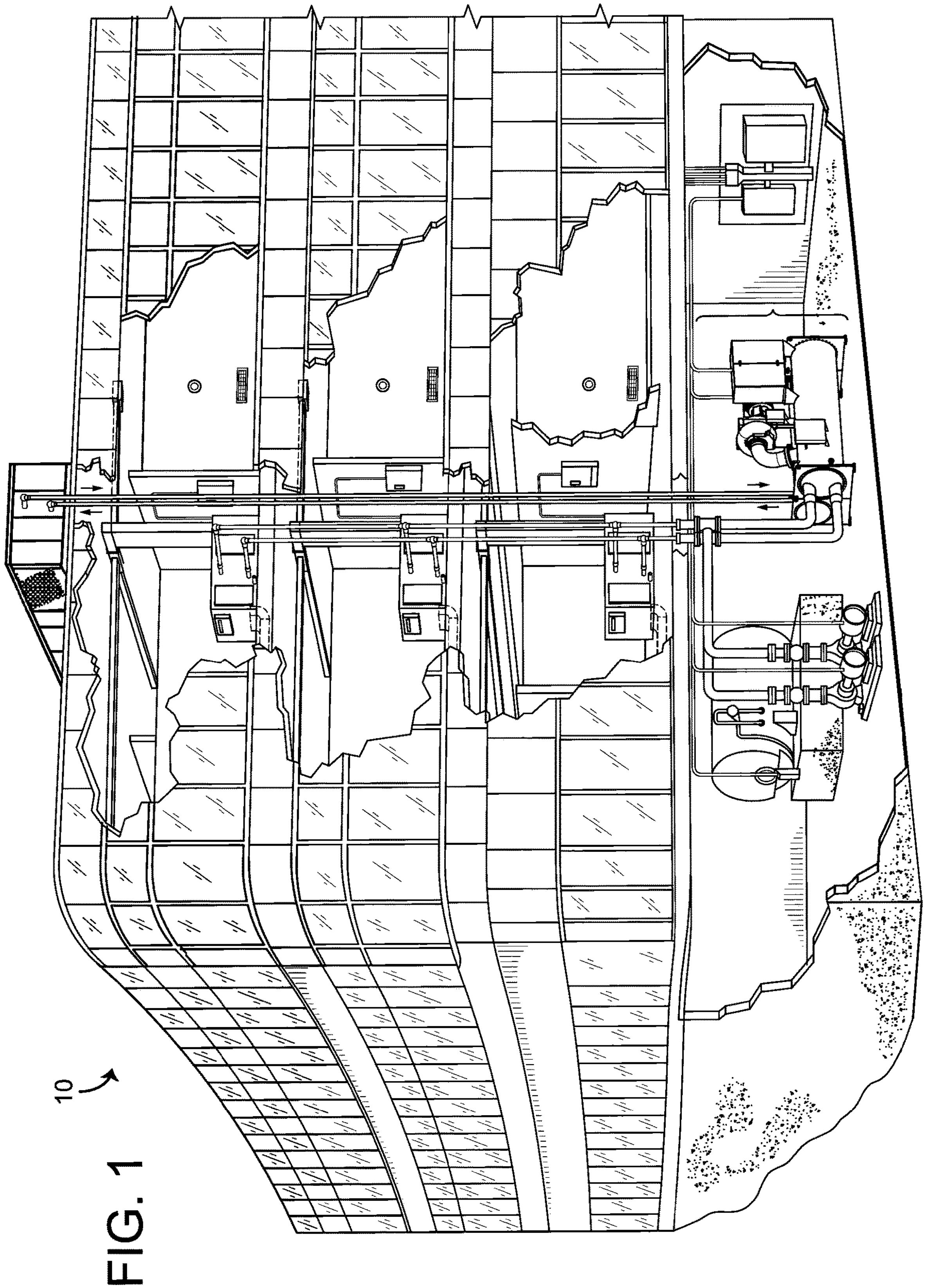
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
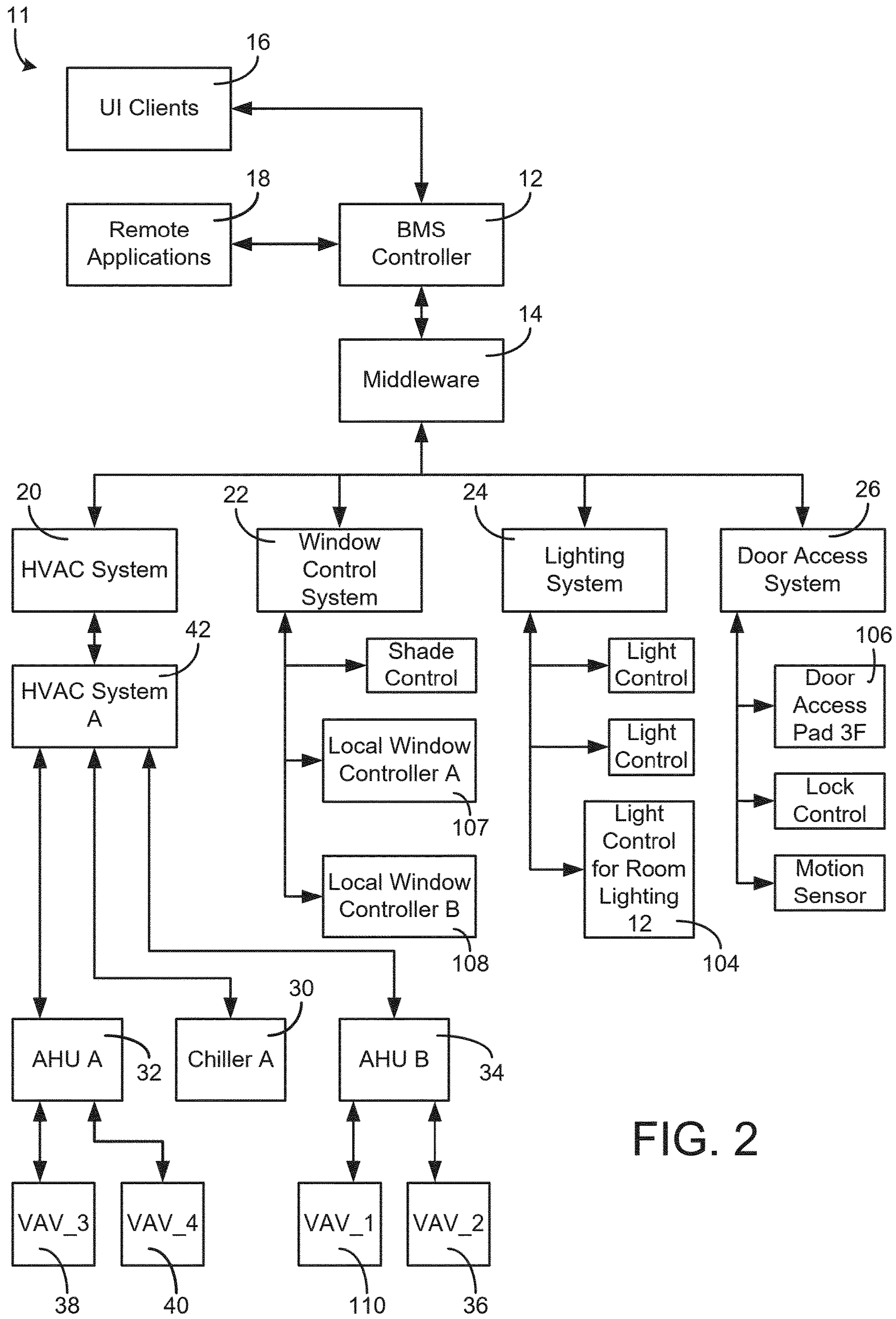
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building sub system makeup.

Figure 3:
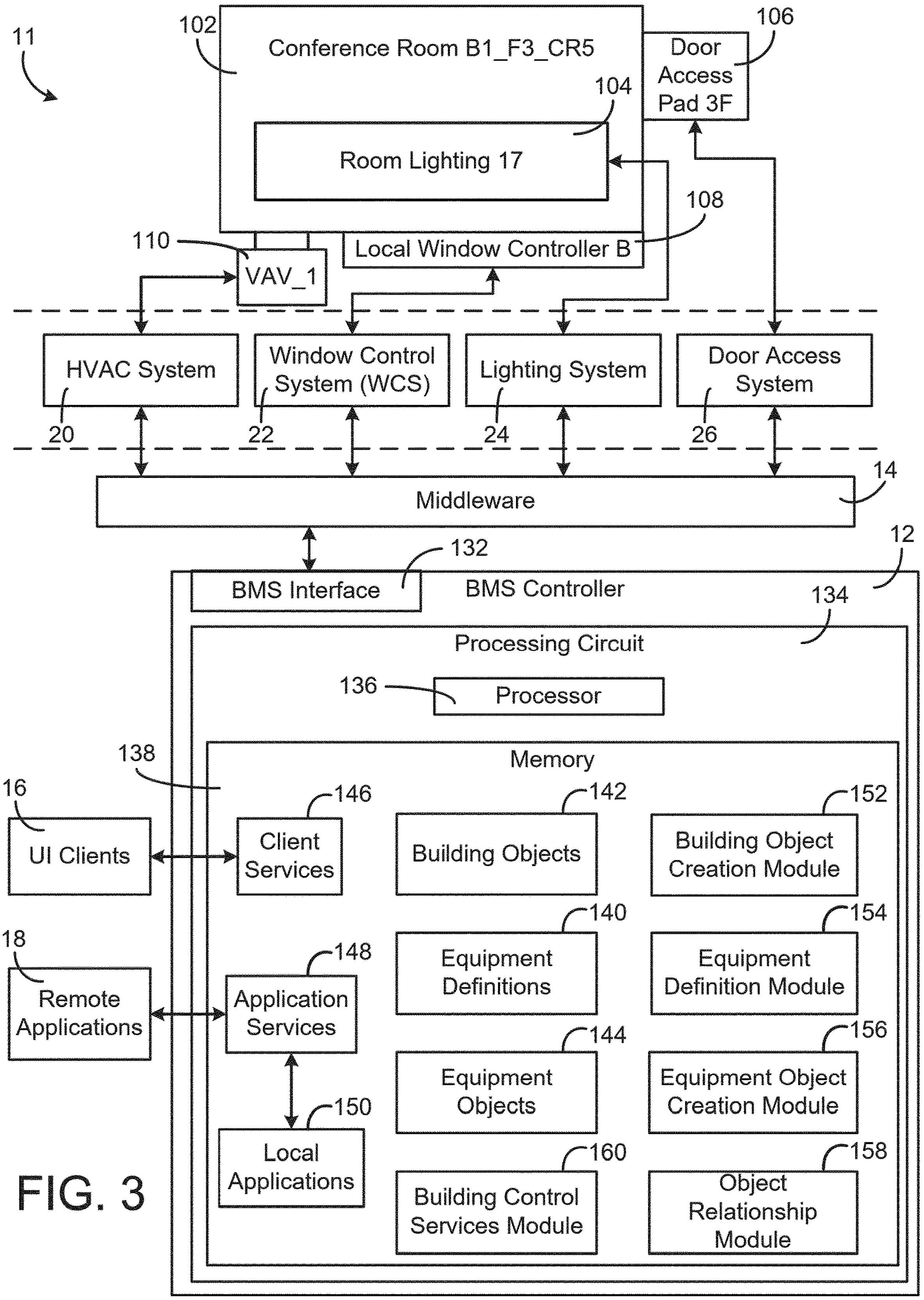
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20. SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18. SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
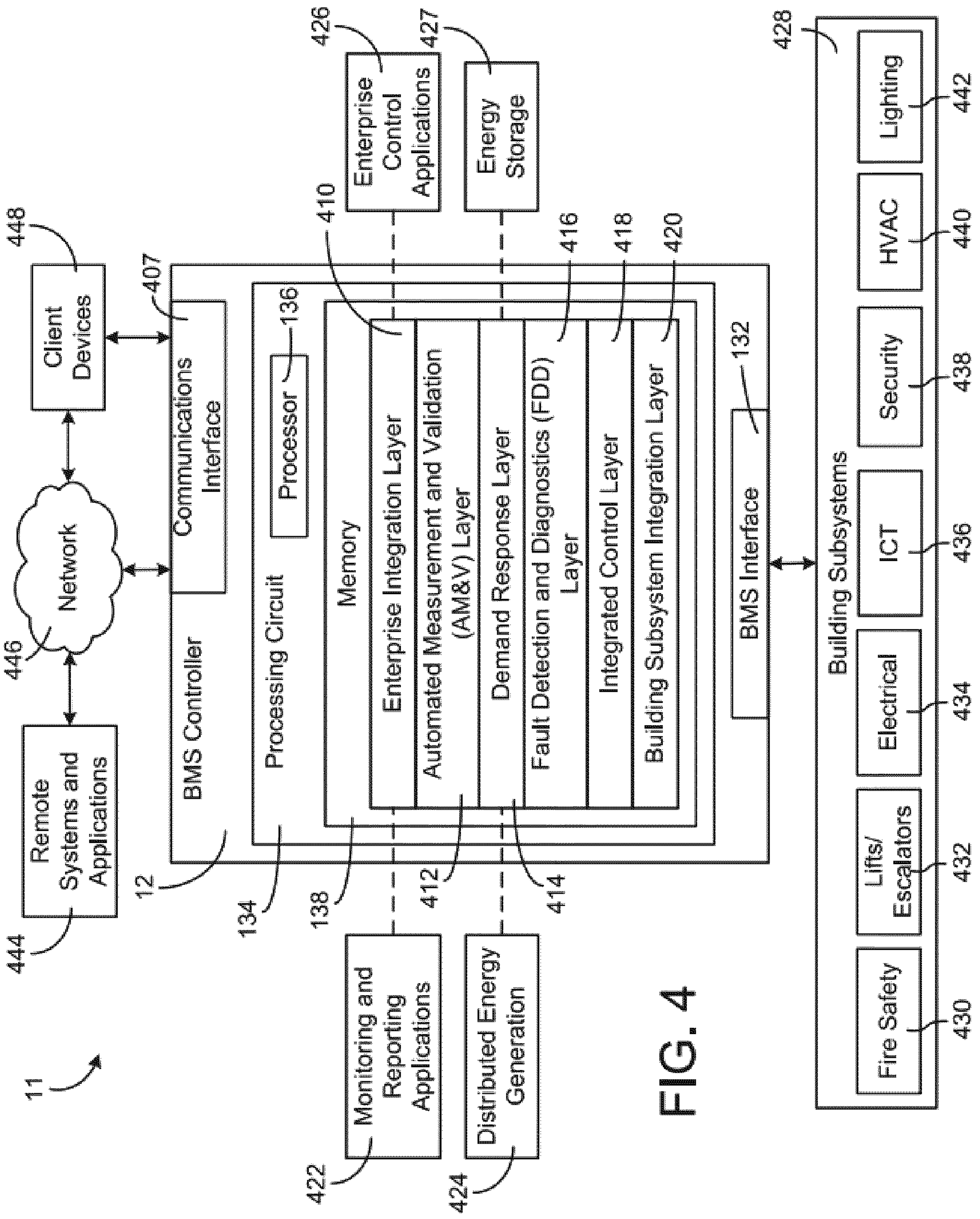
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

BMS with Event Data Representation

Figure 5:
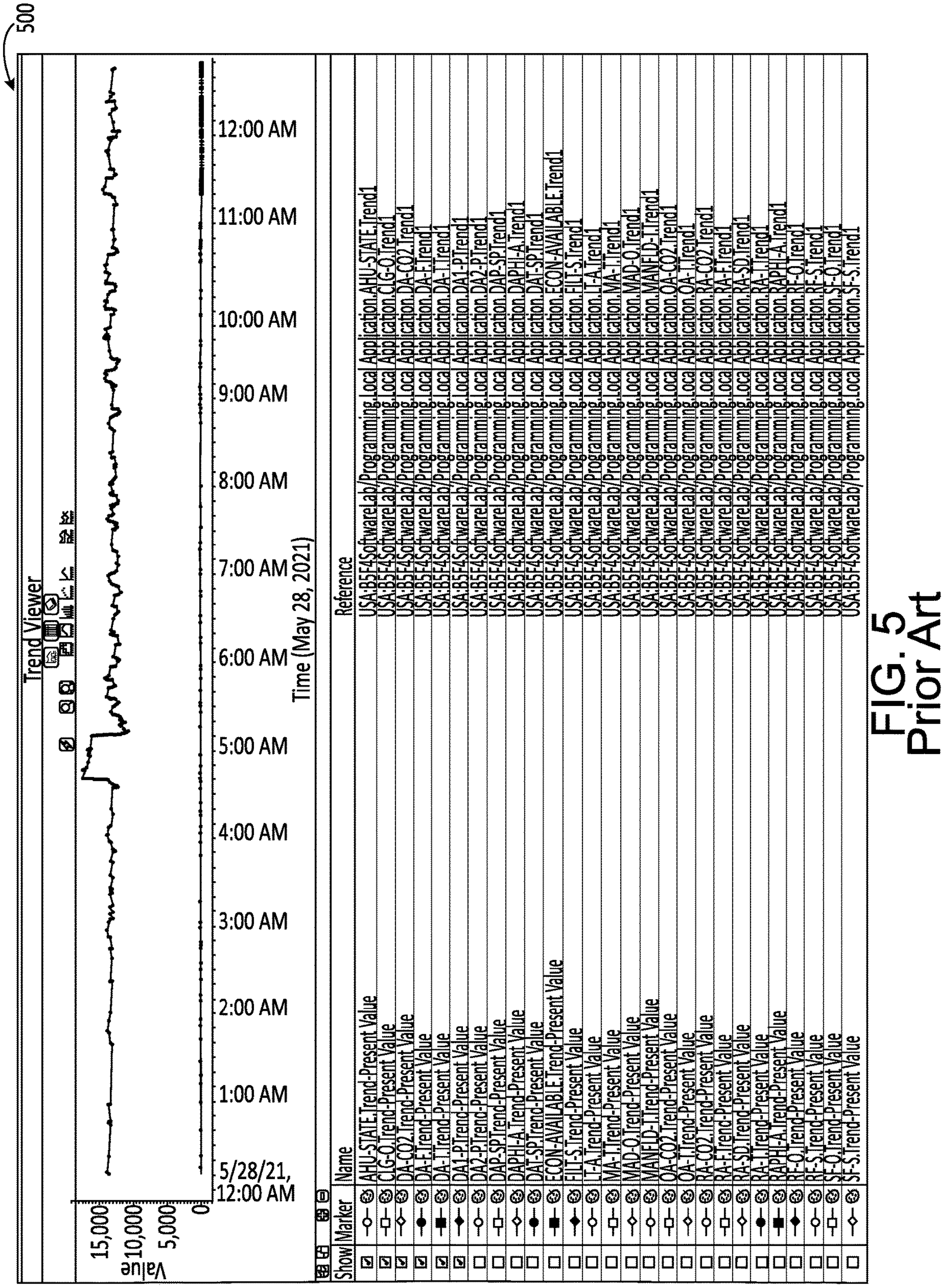
FIG. 5 Prior Art
FIG. 5 is a snapshot of an example interface depicting a trend viewer of prior art, according to some embodiments.

Referring now to FIG. 5, a snapshot of an example interface depicting a trend viewer 500 of prior art is shown, according to some embodiments.

Conventionally, trend viewer 500 provides a graphical representation of data such as values received from building equipment at pre-determined time intervals. The trend viewer 500 of the prior art poses a time limit and therefore provides graphical representation up to a certain time period which can be few hours. This limitation of the trend viewer 500 makes it difficult for an operator to ascertain the cause of an alarm, if the alarm was triggered during long non-working hours.

For example, if a building equipment, such as an Air Handling Unit (AHU) trips on the freeze stat during non-working hours such as weekend, shuts down and causes an alarm, the operator may not get a chance to look at it until Monday morning. Thus, the operator may not have access to the data from the AHU from the time when the alarm was triggered, due to passage of time. For example, such data can indicate if a hot water valve was closed, if there was lack of hot water in the system, or if the outside damper was stuck open, etc. Without such data, the operator may not know actual cause of this alarm condition.

In another example, if an alarm was triggered for a space being too warm or cold, then the root cause of this alarm condition may not be immediately apparent. However, the operator may be able to determine root cause of the alarm based on event data that is associated with the alarm. The event data (i.e., data from a time period around the alarm) can be used to ascertain if the damper was open, if the hot or cold water valves were open or if supplied air to VAV box was outside a valid range, at the time of triggering of the alarm. However, the conventional user interface as depicted in FIG. 5 is not able to present such data. Additionally, the trend viewer 500 may not retain some of the data (event data) associated with the alarm after clearance of the alarm. For example, if the event data falls back in valid range, the alarm may get cleared automatically. However, the event data at the time of triggering of the alarm may not be retained, post clearance of the alarm. Thus, it becomes difficult for the operator to ascertain the cause of triggering of the alarm due to unavailability of sufficient event data pertaining to the alarm.

Figure 6:
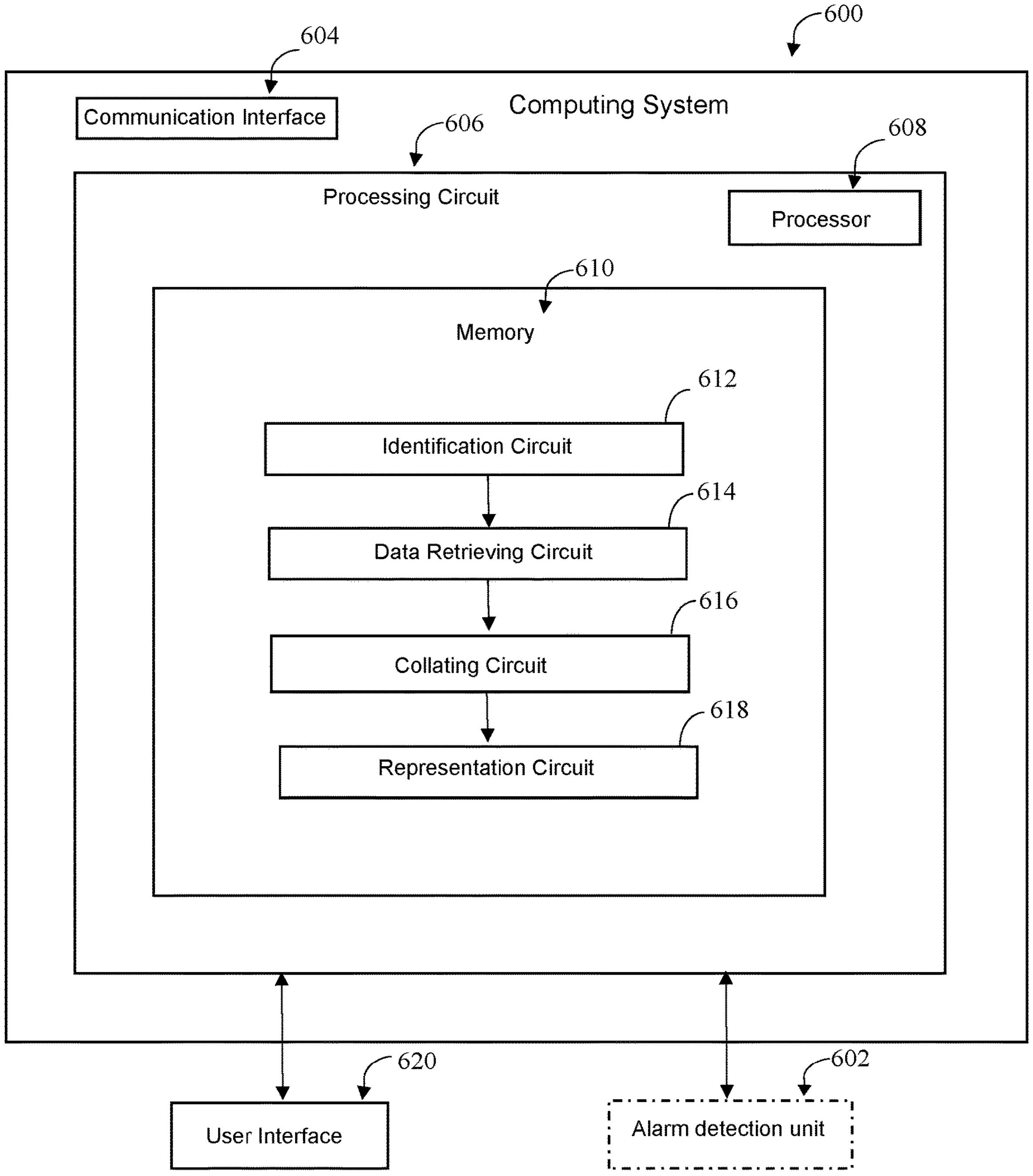
FIG. 6 is a block diagram of a computing system that can be used in a BMS, according to some embodiments.

Referring now to FIG. 6, a block diagram illustrating a computing system 600 is shown, according to some embodiments. Computing system 600 can be a controller of the building management systems (BMS) described above with respect to FIGS. 1-4. Computing system 600 is shown to include a communication interface 604 and a processing circuit 606. Communication interface 604 may include wired or wireless interfaces (e.g., jacks, antennas, transmitters, receivers, transceivers, wire terminals, etc.) for conducting data communications with various systems, devices, or networks. For example, communication interface 604 may include an Ethernet card and port for sending and receiving data via an Ethernet-based communications network and/or a Wi-Fi transceiver for communicating via a wireless communications network. Communication interface 604 may be configured to communicate via local area networks or wide area networks (e.g., the Internet, a building WAN, etc.) and may use a variety of communication protocols (e.g., BACnet, IP, LON, etc.).

Communication interface 604 may be a network interface configured to facilitate electronic data communications between the computing system 600 and various external systems or devices (e.g., one or more user interfaces 620). In some embodiments, the communication interface 604 can be the communication interface of the building management systems (BMS) described above with respect to FIGS. 1-4. In some embodiments, the user interface 620 may be associated with an electronic device of the user. The electronic device can be one of, but not limited to, desktop, laptop, computer, mobile, smartphone, or any other electronic device having communication capabilities.

A processing circuit 606 is shown to include a processor 608 and a memory 610. In some embodiments, the processing circuit 606 can be the processing circuit of the building management systems (BMS) described above with respect to FIGS. 1-4. The processor 608 may be a general purpose or specific purpose processor, an application specific integrated circuit (ASIC), one or more field programmable gate arrays (FPGAs), a group of processing components, or other suitable processing components. The processor 608 may be configured to execute computer code or instructions stored in memory 610 or received from other computer readable media (e.g., CDROM, network storage, a remote server, etc.).

The memory 610 may include one or more devices (e.g., memory units, memory devices, storage devices, etc.) for storing data and/or computer code for completing and/or facilitating the various processes described in the present disclosure. The memory 610 may include random access memory (RAM), read-only memory (ROM), hard drive storage, temporary storage, non-volatile memory, flash memory, optical memory, or any other suitable memory for storing software objects and/or computer instructions. The memory 610 may include database components, object code components, script components, or any other type of information structure for supporting various activities and information structures described in the present disclosure. The memory 610 may be communicably connected to the processor 608 via the processing circuit 606 and may include computer code for executing (e.g., by processor 608) one or more processes described herein.

Still referring to FIG. 6, the computing system 600 is shown to include an identification circuit 612. The identification circuit 612 is shown to be in communication with the user interface 620 via the communication interface 604. In some embodiments, the identification circuit 612 may be used to identify occurrence of a flag signal. In some embodiments, the identification circuit 612 may communicate with an alarm detection unit 602 to determine occurrence of the flag signal. The flag signal may correspond to an alarm generated by the alarm detection unit 602. The alarm detection unit 602 may be in communication with BMS described above in FIG. 1-4. The alarm detection unit 602 may generate the alarm based on presence of outliers in data pertaining to one of the building equipment affiliated with the BMS, for example data values and/or trends that violate one or more rules or criteria. In some embodiments, the alarm detection unit 602 may be a part of the computing system 600. In some other embodiments, the alarm detection unit 602 may be external to the computing system 600.

The identification circuit 612 may be further configured to identify a building equipment at fault based on the flag signal. Further, the identification circuit 612 may be configured to identify one or more data points associated with the building equipment. In some embodiments, the one or more data points may be alternatively referred as items. For example, the building equipment may be an Air Handling Unit as described above in FIGS. 1-4 and one or more data points associated with the Air Handling Unit may comprise cooling output, discharged air flow etc.

Still referring to FIG. 6, the computing system 600 is shown to include a data retrieving circuit 614. The data retrieving circuit 614 may be configured to cooperate with the identification circuit 612. The data retrieving circuit 614 may retrieve information associated with the one or more data points at the time of occurrence of the flag signal or triggering of alarm. In addition, the data retrieving circuit 614 may retrieve setpoints for each data point from the memory 610. The setpoints may be predefined and stored in the memory 610.

Further, the computing system 600 is shown to include a collating circuit 616. The collating circuit 616 may be configured to cooperate with the identification circuit 612 and the data retrieving circuit 614 to collate the one or more identified data points, and information associated with the one or more data points, to generate event data pertaining to the building equipment at the time of occurrence of the flag signal. Further, the event data may be stored in the memory 610, such that the event data may be retained and viewed later. The collating circuit 616 may then provide the collated event data to the representation circuit 618.

Still referring to FIG. 6, the computing system 600 is shown to include a representation circuit 618. The representation circuit 618 may be configured to cooperate with the collating circuit 616 to obtain the event data. The representation circuit 618 is shown to be in communication with the user interface 620 typically, via the communication interface 604. The representation circuit 618 may communicate with the user interface 620 to request additional input data from a user. In some embodiments, the representation circuit 618 may be configured to receive an indication to view event data, upon request by a user via the user interface 620. In some embodiments, the representation circuit 618 may be configured to communicate with the user interface 620 to request and fetch additional information pertaining to the building equipment and input data from the user.

Further, the representation circuit 618 may be configured to represent the event data for the identified building equipment over the user interface 620. In some embodiments, the representation circuit 618 may represent the event data in at least one form selected from a group consisting of graphical, tabular, and listed form. Further, in some embodiments, the representation circuit 618 may represent the event data for the identified building equipment, in the form of a snapshot over the user interface 620. In an exemplary embodiment, the snapshot may comprise one or more tabs such as a summary tab, a focus tab, and a snapshot focus tab. In some embodiments, there may be more or fewer tabs, as required.

For an example, the summary tab may include multiple columns such as item column (alternatively referred as data point), status column, value column, and description column. The item column may comprise list of all identified data points associated with the identified building equipment. For example, the data points may include, but not limited to, cooling output, discharged air flow etc. Further, the values column may show information associated with the one or more data points at the time of occurrence of the flag signal. The description column may show description of each data point. The status column may show indication of a flag signal associated with any of the data point. As described above, the flag signal may correspond to an alarm indicating a presence of an outlier pertaining to the data point. Also, the representation circuit 618 may keep a status associated with a data point as blank, if there is no indication of flag signal pertaining to that data point.

In an embodiments, the representation circuit 618 can be enabled to represent the event data in any other simplified manner. In some embodiments, the representation circuit 618 may be enabled to represent the event data differently based on inputs provided by the user via the user interface 620. In some embodiments, the event data for the identified building equipment may be further stored in the memory 610 as historical data. Additionally, in some embodiments, the representation circuit 618 may represent the setpoints for the identified data points, along with the event data.

Additionally, the computing system 600 may be in communication with the user interface 620 as referred above. The user interface 620 may be configured to receive a notification for occurrence of an alarm from the computing system 600. Further, the user interface 620 may be configured to provide an indication to view event data, pertaining to the alarm. The user interface 620 may further receive event data comprising one or more data points and information associated with the one or more data points at the time of occurrence of the alarm. In some embodiments, the user interface 620 may be communicatively coupled with the processing circuit 606 to receive the event data pertaining to a building equipment associated with the alarm. Further, the user interface 620 may be configured to display the event data. In some embodiments, the user interface 620 may be configured to display the event data in at least one form selected from a group consisting of a graphical, tabular, and listed form. Further, in some embodiments, the user interface 620 may be configured to display the event data in the form of a snapshot such as snapshot 700 as described above.

Thus, the snapshot of the event data for the identified building equipment may be retained and viewed later in time. The snapshot overcomes the limitations associated with the conventional techniques, wherein the event data is provided for a limited period of time. In addition, the snapshot provides sufficient event data, post clearance of the flag signal for enabling users to ascertain the cause of occurrence of the flag signal.

Further, in some embodiments, the computing system 600 may include an analytics engine (not shown). The analytics engine may be in communication with the identification circuit 612, the data retrieving circuit 614, the collating circuit 616, and the representation circuit 618. The analytics engine may utilize one or more machine learning and/or artificial intelligence techniques. As referred above, the event data for the identified building equipment pertaining to the flag signal may be further stored in the memory 610, as historical data. The analytics engine may be configured to analyze and continuously learn from the stored historical data. Also, the analytics engine may keep a track of the outliers and corrected values for the outliers post clearance of the flag signal. The analytics engine may be further configured to analyze a captured event data with respect to the stored historical data for generating recommendations for users. The recommendations may enable users to ascertain possible causes of occurrence of the flag signal. In addition, the analytics engine may suggest preventive actions towards flag signals in order to obtain corrected values for any outliers present in the computing system 600.

Referring now to FIG. 7, a snapshot 700 of an example interface depicting representation of event data is shown, according to some embodiments. The snapshot 700 is generated by the representation circuit 618 as described in FIG. 6 above. The snapshot 700 shows representation of a flag signal 718 indicating an alarm and corresponding to a building equipment fault. In an embodiment, the flag signal 718 is highlighted or represented in a format that can be clearly distinguished from other represented data. Further, the snapshot 700 shows a building equipment 702 such as AHU-3P4 at fault based on the flag signal 718. The snapshot 700 further shows one or more tabs such as a summary tab 704, a focus tab 706, and a snapshot focus tab 708. In some embodiments, there may be more or fewer tabs, as required. Further, the summary tab 704 includes multiple columns such as, but not limited to, status 710, item 712, value 714 and description 716. The item 712 shows a list of one or more identified data points associated with the building equipment 702. The value 714 shows information associated with the one or more identified data points or item 712 at the time of occurrence of the flag signal or triggering of alarm. The description 716 provides description for each of the identified data points or items 712. The status 710 column indicates presence of outliers or flag signal pertaining to a data point, for example a high alarm is shown at 718. Further, in some embodiments, the focus tab 706 and the snapshot focus tab 708 may provide additional information pertaining to the flag signal and/or building equipment at fault. Thus, the snapshot 700 generated by the representation circuit 618 of FIG. 6 provides event data associated with the flag signal that can be retained and viewed later.

Accordingly, the snapshot 700 can be provided via a graphical user interface a time later than the time of occurrence of the flag signal, of the fault, etc., enabling a user to go back and see what conditions were like when the fault occurred. In conventional systems, such data may not be available (e.g., automatically lost after a certain amount of time, presented live but not stored, etc.) or may only available for a limited number of points given memory limits on storing larger sets of timeseries BMS data, such that a user would not be able to go back and have a full picture of relevant data points at the time of the fault. Accordingly, the snapshot taught herein provides an efficient approach (e.g., in terms of memory storage requirements) for enabling review of a building fault at a later time (e.g., days later, weeks later), including after the fault is no longer or occurring or is cleared from a set of alarms.

Figure 8:
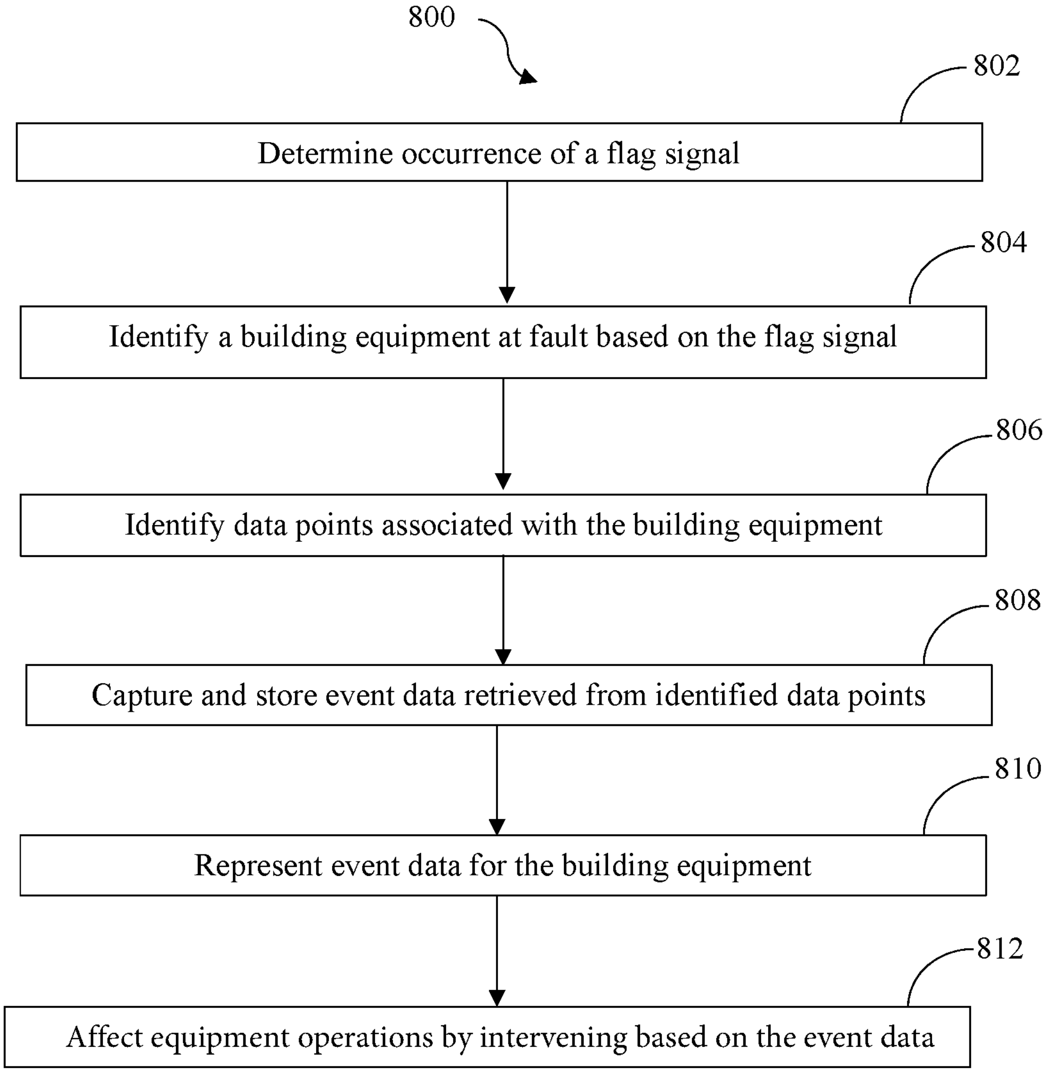
FIG. 8 is a flowchart of a method for representing event data in a BMS, according to some embodiments.

Referring now to FIG. 8, a flow chart of a method 800 for representing event data in a building management system (BMS) is shown, according to an exemplary embodiment. In some embodiments, the method 800 is performed by the computing system 600. Alternatively, the method 800 may be partially or completely performed by another computing system or controller of the BMS. The method 800 is shown to include determining an occurrence of a flag signal at step 802. In some embodiments, the occurrence of the flag signal may be determined by the identification circuit 612 as described above in FIG. 6. The flag signal may correspond to an alarm (such as 718 shown in FIG. 7) generated by the alarm detection unit 602 associated with the BMS as described above in FIG. 6. The alarm detection unit 602 may generate the alarm based on presence of outliers in data pertaining to one of the building equipment affiliated with the BMS. The alarm detection unit 602 may generate the alarm based on detecting that a criterion is violated, for example that a value of a data point is outside an expected range for at least a threshold amount of time. In one non-limiting embodiment, the alarm may be based on any one of the operational status of the building equipment.

Subsequent to determining occurrence of the flag signal, the method 800 is shown to include identifying one or more building equipment at fault based on the flag signal (Step 804). In some embodiments, the building equipment at fault may be identified by the identification circuit 612 as described above in FIG. 6. Step 804 can include determining a particular unit of building equipment at fault based on information included with the alarm in combination with relationships from the objection relationship module 158 and/or equipment definitions/objections/etc. provided by the BMS controller 12 as shown in FIG. 3.

Further, the method 800 is shown to include identifying (e.g., selecting) one or more data points associated with the identified building equipment (at Step 806). In some embodiments, the one or more data points may be alternatively referred as items such as item 712 as shown in FIG. 7. For example, an equipment object (e.g., equipment objects 144) or equipment definition (e.g., equipment definitions 140) may provide a list of data points associated with the identified building equipment, i.e., data points that should be captured if a fault is detected for the corresponding equipment. In some embodiments, a digital twin of the building which includes representations of equipment, sensors, data points, etc. and relationships therebetween is used for identifying the one or more data points associated with the identified building equipment in step 806.

The method 800 is also shown to include capturing and storing event data for the identified data point (at Step 808). In step 808, a snapshot of conditions at the time of the fault is captured. For example, information associated with the one or more identified data points at the time of occurrence of the flag signal or error (e.g., values for the data points at the time of the fault). In addition, the method 800 may also retrieve setpoints or other expected values for at least some of the identified data points. In some embodiments, the setpoints may be predefined and stored in the memory 610, may be user adjustable, may be output by control logic (e.g., setpoint optimizations, model predictive control), etc. Further, the one or more identified data points and the information associated with the one or more data points around the time of occurrence of the flag signal may be collated to generate the event data. In some embodiments, the event data may be collated by the collating circuit 616 as described above in FIG. 6. Further, the event data may be provided to the representation circuit 618.

Step 808 can also include abstaining from storing other data available in a BMS. For example, step 808 can include abstaining from storing values for the data points at times other than the time of occurrence of the flag signal or error, for example such that such values cannot be later view in the BMS, at least via an interface associated with assessing faults. As another example, step 808 can include abstaining from storing values for other data points, such as data points available in the BMS but not identified/selected in step 806. In some embodiments, both such abstaining steps are included. Accordingly, process 800 provides for computer memory savings by storing only data relevant to assessing a fault without storing extra data, as it is often the case that the total available BMS data over time is substantially more than can be feasibly stored for later analysis due to computer memory demands, hardware and energy costs for storage, etc. The teachings herein thereby provide technical advantages over other approaches.

Additionally, the method 800 is shown to include representing event data for the identified building equipment (Step 810). In some embodiments, the representation of the event data may be performed by the representation circuit 618, as described above in FIG. 6. In some embodiments, the event data may be represented in at least one form selected from a group consisting of graphical, tabular, and listed form. In some embodiments, the setpoints for the identified data points may also be represented along with the event data. Further, in some embodiments, the event data for the building equipment may be represented in the form of a snapshot such as snapshot 700 (as shown in FIG. 7 above). In an exemplary embodiment, the snapshot 700 may comprise one or more tabs such as the summary tab 704, the focus tab 706, and the snapshot focus tab 708.

Further, the summary tab 704 may include multiple columns such as item 712, status 710, value 714, and description 716 (as shown in FIG. 7). The item 712 may comprise details of all the identified data points associated with the identified building equipment. For example, the item 712 or data points may include, but not limited to, cooling output, discharged air flow etc. Further, the value 714 column may show information associated with the one or more data points 712 at the time of occurrence of the flag signal. The description 716 column may show description of each data point 712. The status 710 column may indicate occurrence of a flag signal associated with any of the data point or item 712. As described above, the flag signal may correspond to an alarm (such as 718 shown in FIG. 7) indicating presence of outliers pertaining to any of the data point. Thus, the method 800 provides the representation of event data in the form of a snapshot that can be retained and viewed later, thereby enabling users to ascertain the cause of occurrence of the flag signal.

At step 812, the method 800 further includes adjusting operations of the equipment based on the event data, for example by performing an intervention to resolve or otherwise address a root cause of the flag signal. In some embodiments, setpoints, control logic parameters, etc. can be adjusted (e.g., automatically by the computing system 600) to control the equipment in a manner to resolve the root cause of the flag signal, reduce the likelihood of future alarms, etc. in step 812. In some embodiments, maintenance can be executed in step 812, for example physically modifying equipment (e.g., replacing equipment, repairing equipment, adjusting physical configuration of equipment) to resolve the alarm. Various tangible, practical results of process 800 can thereby be provided which improve building equipment performance and overall operations of a building system.

Figure 9:
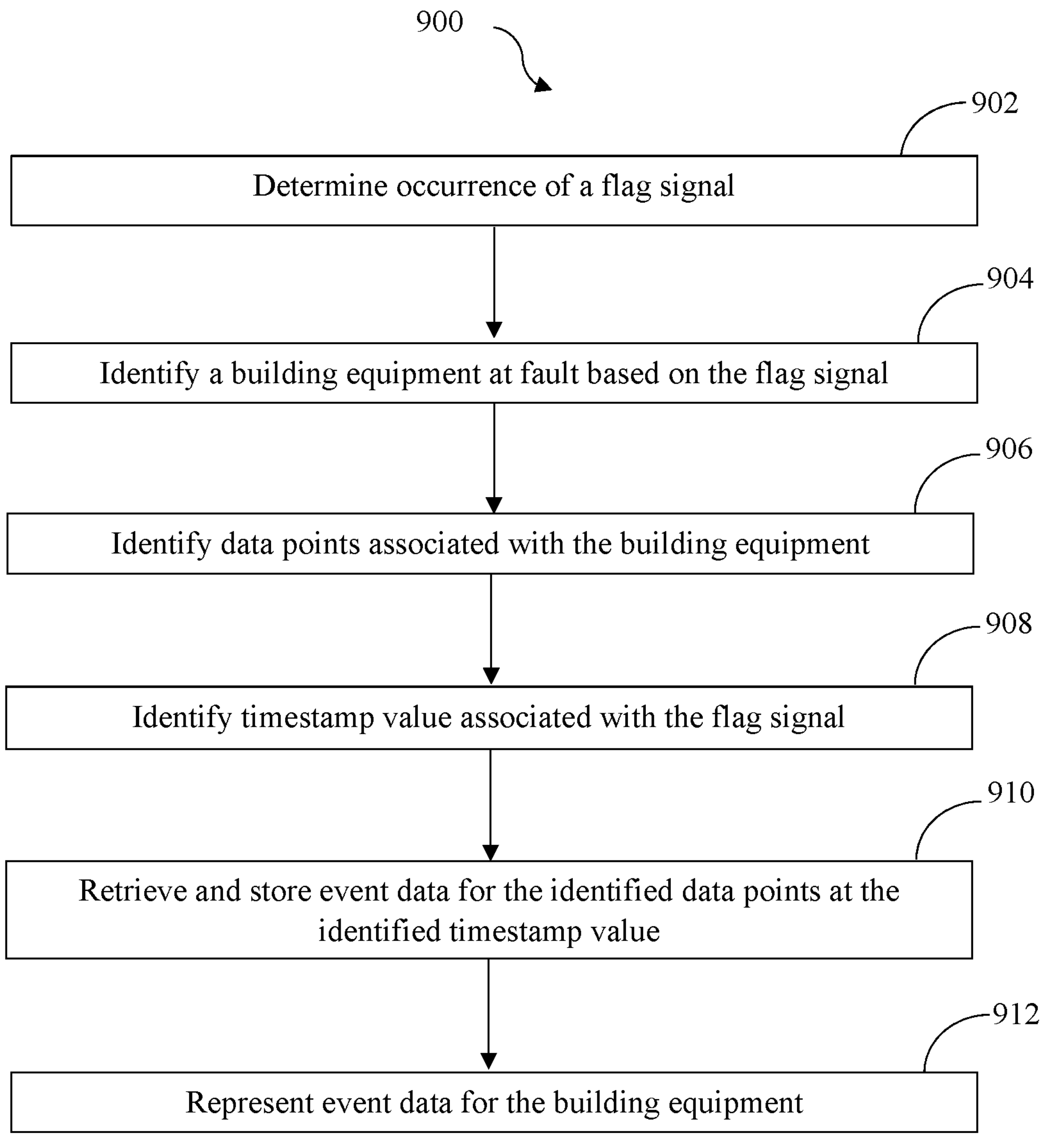
FIG. 9 is another flowchart of a method for representing event data in a BMS, according to some embodiments.

Referring now to FIG. 9, another flow chart of a method 900 for representing event data in a building management system (BMS) is shown, according to an exemplary embodiment. In some embodiments, the method 900 is performed by the computing system 600. Alternatively, the method 900 may be partially or completely performed by another computing system or controller of the BMS. The method 900 is shown to include determining an occurrence of a flag signal (Step 902). In some embodiments, the occurrence of the flag signal may be identified by the identification circuit 612 as described above in FIG. 6. The flag signal may correspond to an alarm generated by the alarm detection unit 602 associated with the BMS as described above in FIG. 6. The alarm detection unit 602 may generate the alarm based on presence of outliers in data pertaining to one of the building equipment affiliated with the BMS, violation of alarm rules or limits, detection of trends in data, etc. In one non-limiting embodiment, the alarm may be based on any one of the operational status of the building equipment.

Subsequent to determining occurrence of the flag signal, the method 900 is shown to include identifying one or more building equipment at fault based on the flag signal (Step 904). For example, the building equipment 702 shown in FIG. 7 is associated with the flag signal 718. In some embodiments, the building equipment at fault may be identified by the identification circuit 612 as described above with reference to FIG. 6.

Further, the method 900 is shown to include identifying one or more data points associated with the identified building equipment (Step 906). In some embodiments, the one or more data points may be alternatively referred as items such as item 712 as shown in FIG. 7.

Further, the method 900 is shown to include identifying timestamp value(s) associated with the flag signal (Step 908). The timestamp value(s) may indicate the time of occurrence of the flag signal which corresponds to (e.g., is the same as) the time of occurrence of a building equipment fault. In some embodiments, the timestamp value may be retrieved from the alarm detection unit 602. The timestamp value(s) may be a point in time (e.g., representing an instant, moment, etc.) or may indicate a range of times, for example a duration throughout which the alarm corresponding to the flag signal persisted.

Further, the method 900 is shown to include retrieving event data for the identified data points at the identified timestamp value(s) (Step 910). The event data may include the one or more identified data points and information associated with the one or more data points (e.g., values of the one or more data points) at the time of occurrence of the flag signal or triggering of the alarm. The information for the one or more data points can be time series data for a range of times indicated by the timestamp value(s) and in some embodiments can include data for timestamps before and/or after the identified timestamp value(s). In some embodiments, the duration of time included in the event data is determined based on the time of fault indicated by the flag signal, the time of equipment, the duration of the flag signal, etc. in various embodiments. Further, the method 900 may also retrieve setpoints or other expected values for each data point. In some embodiments, the setpoints may be predefined and stored in the memory 610. In some embodiments, the event data at the identified timestamp value and setpoints or other expected values may be retrieved by the data retrieving circuit 614 as described in FIG. 6.

Further, the method 900 may include storing the event data with the identified timestamp value in the memory 610. In some embodiments, the event data may be stored along with the identified timestamp values in the memory 610 as historical data. The stored timestamp values may enable users to view event data associated with the flag signal back in time when the flag signal occurred. This may allow users to identify and investigate the cause of occurrence of the flag signal.

Further, the method 900 is shown to include representing event data for the identified building equipment (Step 912). In some embodiments, the representation of the event data may be performed by the representation circuit 618, as described above in FIG. 6. In some embodiments, the event data may be represented in at least one form selected from a group consisting of graphical, tabular, and listed form. In some embodiments, the setpoints for the identified data points may also be represented along with the event data. Further, in some embodiments, the event data for the identified building equipment may be represented in the form of a snapshot such as snapshot 700 (as shown in FIG. 7 above). In an exemplary embodiment, the snapshot 700 may comprise one or more tabs such as the summary tab 704, the focus tab 706, and the snapshot focus tab 708.

Further, the summary tab 704 may include multiple columns such as item 712, status 710, value 714, and description 716 (as shown in FIG. 7). The item 712 may comprise details of all the identified data points associated with the identified building equipment. For example, the item 712 or data points may include, but not limited to, cooling output, discharged air flow etc. Further, the value 714 column may show information associated with the one or more data points at the time of occurrence of the flag signal. The description 716 column may show description of each data point. The status 710 column may indicate occurrence of a flag signal associated with any of the data point. As described above, the flag signal may correspond to an alarm (such as 718 shown in FIG. 7) indicating presence of outliers pertaining to any of the data point. In some embodiments, the event data may be represented along with the timestamp values. Thus, the method 900 provides the representation of event data with identified timestamp values, in the form of a snapshot that can be retained and viewed later. The snapshot may enable users to ascertain the cause of occurrence of the flag signal.

In some embodiments, the method 900 also includes adjusting operations of the equipment in response to the fault, for example by performing an intervention to resolve or otherwise address a root cause of the flag signal. In some embodiments, setpoints, control logic parameters, etc. can be adjusted (e.g., automatically by the computing system 600) to control the equipment in a manner to resolve the root cause of the flag signal, reduce the likelihood of future alarms, etc. In some embodiments, maintenance can be executed as a result of process 900, for example physically modifying equipment (e.g., replacing equipment, repairing equipment, adjusting physical configuration of equipment) to resolve the alarm. Various tangible, practical results of process 900 can thereby be provide which improve building equipment performance and overall operations of a building system.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for facilitating analysis of a fault in a building system, the method comprising:
- abstaining from storing, as historical data, values of a first point which occur at times when the fault is not occurring;
- determining, by a processing circuit, an occurrence of the fault;
- capturing, by the processing circuit at a time of the occurrence of the fault, a snapshot of conditions at the time by:
  - selecting a set of data points relating to a building equipment experiencing the fault, the set of data points comprising the first point; and
  - storing as historical data, in response to the fault, and by the processing circuit, event data comprising values of the set of data points at the time of occurrence of the fault; and
- facilitating analysis of the fault by providing, at a later time after the time of occurrence of the fault, the snapshot via a graphical user interface, the snapshot comprising the event data, wherein the values for the first point which occur at the times when the fault is not occurring are unavailable via the graphical user interface at the later time.

2. The method of claim 1, wherein the snapshot comprises a list of the set of data points and the values for the set of data points at the time of occurrence of the fault.

3. The method of claim 1, wherein the method comprises abstaining from storing other values of the set of data points corresponding to times other than the time of occurrence of the fault.

4. The method of claim 1, wherein selecting the set of data points relating to the building equipment experiencing the fault is performed based on a flag signal associated with the fault, wherein the flag signal corresponds to a range of timestamp values corresponding to the time of occurrence of the fault.

5. The method of claim 1, wherein storing the event data comprises abstaining from storing values of other data points of the plurality set of data points, the other data points not included in the set of data points.

6. The method of claim 1, comprising receiving, at the later time, a user request to view information corresponding to the fault, and providing the snapshot via the graphical user interface in response to the user request.

7. The method of claim 1, wherein the method comprises abstaining from storing values of the set of data points for times other than the time of occurrence of the fault such that the values of the set of data points for times other than the time of occurrence of the fault are unavailable at the later time.

8. The method of claim 1, further comprising altering an operation of the building equipment based on the snapshot.

9. A building management system (BMS), comprising:
- building equipment operable to affect one or more variable states or conditions of a building; and
- processing circuitry programmed to:
  - abstain from storing, as historical data, values of a first point which occur at times when a fault is not occurring;
  - capture, by the processing circuitry at a time of an occurrence of the fault, a snapshot of conditions at the time by:
    - selecting a set of data points relating to a portion of the building equipment experiencing the fault, the set of data points comprising the first point; and
    - storing as historical data, in response to the fault, event data comprising values of the set of data points at the time of occurrence of the fault; and
  - facilitate analysis of the fault by providing, at a later time after the time of occurrence of the fault, the snapshot via a graphical user interface, the snapshot showing the event data, wherein the values for the first point which occur at the times when the fault is not occurring are unavailable via the graphical user interface at the later time.

10. The system of claim 9, wherein the snapshot comprises a list of the set of data points and the values for the set of data points at the time of occurrence of the fault.

11. The system of claim 9, wherein the circuitry is programmed to abstain from storing other values of the set of data points corresponding to times other than the time of occurrence of the fault.

12. The system of claim 9, wherein storing the event data comprises storing values for the set of data points without storing values for other data points of the set of data points.

13. The system of claim 9, wherein the circuitry is programed to abstain from storing values of the set of data points for times other than the time of occurrence of the fault such that the values of the set of data points for times other than the time of occurrence of the fault are unavailable to the circuitry at the later time.

14. The system of claim 9, wherein the circuitry is further programmed to alter an operation of the building equipment based on the snapshot.

15. One or more non-transitory computer-readable media storing program instructions that, when executed by one or more processors, cause the one or more processors to perform operations comprising:
- abstaining from storing, as historical data, values of a first point which occur at times when a building equipment fault is not occurring;
- capturing, concurrently with the building equipment fault, a snapshot by:

selecting a set of data points relating to a unit of building equipment experiencing the building equipment fault, the set of data points comprising the first point; and storing as historical data, in response to the fault, values of the set of data points at a time of occurrence of the building equipment fault; and facilitating analysis of the building equipment fault by providing, at a later time after the time of occurrence of the building equipment fault, the snapshot via a graphical user interface, wherein the snapshot comprises the values of the set of data points at the time of occurrence of the building equipment fault, wherein the values for the first point which occur at the times when the building equipment fault is not occurring are unavailable via the graphical user interface at the later time.

16. The one or more non-transitory computer-readable media of claim 15, wherein the operations comprise abstaining from storing other values of the set of data points corresponding to times other than the time of occurrence of the building equipment fault.

17. The one or more non-transitory computer-readable media of claim 15, wherein the operations comprise abstaining from storing values of other data points not included in the set of data points.

18. The method of claim 1, wherein the method comprises analyzing the event data comprising values of the set of data points at the time of occurrence of the fault using a machine learning technique to determine possible causes for the occurrence of the fault.

19. The system of claim 9, wherein the circuitry is further programmed to facilitate analysis of the fault by using a machine learning technique to provide a recommendation regarding the fault.

20. The one or more non-transitory computer-readable media of claim 15, wherein capturing, concurrently with a building equipment fault, the snapshot comprises retrieving expected values for the set of data points at the time of occurrence of the building equipment fault.

* * * * *